United States Patent [19]
Wantling

[11] Patent Number: 6,165,261
[45] Date of Patent: Dec. 26, 2000

[54] WATER-RESISTANT GYPSUM COMPOSITION

[75] Inventor: Steven J. Wantling, Brandon, Miss.

[73] Assignee: Ergon, Inc., Jackson, Miss.

[21] Appl. No.: 09/329,748

[22] Filed: Jun. 10, 1999

[51] Int. Cl.[7] .......................... C04B 11/00; C04B 24/08; C09D 191/08
[52] U.S. Cl. ............................. 106/778; 106/2; 106/271; 106/272; 106/783; 106/822; 156/41
[58] Field of Search ................................ 106/2, 271, 272, 106/778, 783, 822; 156/41

[56] References Cited

U.S. PATENT DOCUMENTS

| | | | |
|---|---|---|---|
| 2,855,319 | 10/1958 | McConnaughay | 106/223 |
| 3,556,827 | 1/1971 | McConnaughay | 106/279 |
| 3,904,428 | 9/1975 | McConnaughay | 106/278 |
| 4,433,084 | 2/1984 | Ostermeyer et al. | 106/277 |
| 4,444,803 | 4/1984 | Winters et al. | 427/485 |
| 4,598,019 | 7/1986 | Yokoyama | 428/407 |
| 4,990,184 | 2/1991 | Dotson et al. | 106/14.11 |
| 5,336,438 | 8/1994 | Schilling et al. | 106/277 |
| 6,066,201 | 5/2000 | Wantling | 106/271 |

*Primary Examiner*—Anthony Green
*Attorney, Agent, or Firm*—Nilles & Nilles, S.C.

[57] ABSTRACT

The present invention relates to water-resistant gypsum compositions, methods of making such composition, as well as manufacturing methods and products comprising such compositions.

40 Claims, No Drawings

WATER-RESISTANT GYPSUM COMPOSITION

FIELD OF THE INVENTION

The present invention relates to water-resistant gypsum compositions.

BACKGROUND OF THE INVENTION

The base material from which gypsum board is manufactured is the hemihydrate form of calcium sulfate (gypsum), commonly termed stucco, which is produced by the heat conversion of the dahydrate from which the water phase has been removed. It is reported that more than 80% of the more than 23 million metric tons produced each year are converted to the hemihydrate state for use in formulating various building materials such as wall (gypsum) board.

Gypsum board absorbs water, which reduces the strength of the wallboard. Previous attempts to instill water-resistant properties to gypsum board include incorporation of asphalt wax additives. The resulting materials were difficult to use and the core properties difficult to control. This led the industry to move away from asphalt/wax based systems and towards polysiloxane based systems as the moisture preventative of choice. Although these materials provided superior moisture resistance and overcame certain problems associated with asphalt/wax systems, they were both expensive and difficult to use. Economics drove the industry to find a more cost-effective method of controlling both moisture and core performance. The result was the incorporation of a wax emulsion comprised of two different types of wax emulsified with a polyvinylalcohol system.

However, the polyvinylalcohol system suffers from a number of deficiencies, including instability and subjection to rapid separation when stationary which requires mixing prior to use. This also affects the core properties due to the stratification of the compounds in the formulation; the solids content is lower than desired which is a function of the chemistry of this system. In addition, because of destabilization into different phases, there is also the potential for bacterial growth which raises system maintenance and personnel issues at a consuming site.

Thus, a need exists for a stable, water-resistant gypsum composition.

SUMMARY OF THE INVENTION

The present invention provides water-resistant gypsum compositions, methods for making gypsum compositions, and manufacturing methods and products comprising such compositions. Preferably, the water-resistant gypsum composition comprises an emulsion comprising slack wax, microcrystalline wax, naphthenic oil, an emulsifier, and preferably a dispersing agent.

The emulsion may comprise slack wax in an amount from about 25 to about 50%, and preferably in an amount from about 35 to about 45% by total weight of the emulsion. Preferably, the emulsion comprises 1–20% microcrystalline wax. Preferably, the emulsion comprises a total wax content of 30–50%. Preferably, the emulsion comprises naphthenic oil in an amount between about 1 to about 10%, and more preferably in an amount between about 2 to about 6% by total weight of the emulsion. The emulsion preferably comprises an emulsifier in an amount from about 0.5 to about 10% by total weight of the emulsion, and more preferably in an amount from about 1 to about 4% by total weight of the emulsion. Preferably, the emulsion comprises a dispersing agent in an amount from about 0.05 to about 5%, and more preferably in an amount from about 0.5 to about 2% by total weight of the emulsion.

The present invention further provides an aqueous emulsion comprising water, slack wax, microcrystalline wax, naphthenic oil, an emulsifier and a dispersing agent, preferably for use in combination with gypsum slurries to form water-resistant gypsum compositions.

The present invention also provides a method of making an aqueous emulsion comprising mixing a hydrocarbon phase comprising slack wax, microcrystalline wax and naphthenic oil with an aqueous phase comprising water, an emulsifier and a dispersing agent. In addition, a stabilizing metallic salt such as an ammonium, Mg, K and/or Ca salt may be added to aqueous phase to control viscometrics. The method preferably further comprises, prior to the mixing step, heating the hydrocarbon phase and heating the aqueous phase. According to a preferred embodiment, the mixing step comprises: dividing the aqueous phase into three portions; adding the first portion of the aqueous phase into the hydrocarbon phase to form an invert emulsion; adding the second portion of the aqueous phase to the invert emulsion until the emulsion reverts; and adding the third portion of the aqueous phase to the resulting reverted mixture until the mixture inverts to form an emulsion.

Preferably, the method further comprises agitating the emulsion; followed by shearing to develop a desired particle size, such as, for example, an average particle size of about 0.5 to about 1.5 microns. In a further embodiment, the method further comprises agitating the emulsion while cooling to set the selected or desired particle size of the aqueous emulsion.

The present invention further provides a method for producing a water-resistant gypsum composition comprising mixing an aqueous slurry comprising calcined gypsum and a waterproofing emulsion, wherein the emulsion comprises slack wax, microcrystalline wax, naphthenic oil, an emulsifier and a dispersing agent. Preferably, the waterproofing emulsion is formed by mixing a hydrocarbon phase comprising slack wax, microcrystalline wax and naphthenic oil with an aqueous phase comprising water, emulsifier and a dispersing agent.

In yet a further embodiment, the present invention provides a water-resistant gypsum composition made according to the methods described herein.

The present invention also provides a slurry composition for forming a water-resistant gypsum composition, wherein the slurry composition comprises (a) an aqueous gypsum slurry comprising calcined gypsum; and (b) a waterproofing emulsion, the emulsion comprising slack wax, microcrystalline wax, naphthenic oil, an emulsifier and a dispersing agent. Preferably, the emulsion is formed by mixing: (i) a hydrocarbon phase comprising slack wax, microcrystalline wax and naphthenic oil with (ii) an aqueous phase comprising water, an emulsifier and a dispersing agent. In a particularly preferred embodiment, the slurry composition is settable by hydration to form a water-resistant gypsum composition.

The present invention further provides products produced using the compositions described herein, including water-resistant gypsum board comprising a core layer juxtapositioned between two outer liners, wherein the core comprises the water-resistant compositions provided herein. According to one embodiment, the water-resistant gypsum board is manufactured by a method comprising forming an assembly by applying first and second liners to opposite surfaces of a core layer of the slurry composition; and drying the assembly under conditions which allow setting of the composition through hydration.

As used herein, the term "slack wax" means a semi refined wax derived from the distillation, de-oiling, and de-waxing of petroleum crude oils. Slack waxes generally have oil contents between 2 and 30 mass percent with melt points between 110° and 140° F.

As used herein, the term "naphthenic oil" means a mixture of aromatic compounds, including monocyclic and fused ring systems, both substituted and non-substituted rings, which have been rendered partially saturated such that the compounds have both aromatic and naphthenic characteristics, therefor exhibiting an affinity for both the hydrocarbon and water phases of the finished emulsion. Preferably, the naphthenic oil is a crude distilled feedstock having little or no paraffin and having undergone catalytic hydrogenation to convert polynuclear aromatics (three or more benzene rings in a compact molecular arrangement) into partially saturated ring structures having both aromatic and naphthenic characteristics, therefor exhibiting an affinity for both the hydrocarbon and water phases of the finished emulsion.

As used herein, the term "three phase emulsion" means an emulsion which is divided into more than two phases. The behavior of these emulsions is due to the presence of a material that does not dissolve in the oil or water. One case is the presence of solid particles identified as slack wax and other certain lignosulfates incorporated into the specific formulation. It has been observed that this emulsion system incorporating three phases has resulted in a reduction of the energy input for the emulsification process and affords a stabilizing mechanism not normally found in these systems. The stabilizing mechanism is understood to be the result of the incorporation of additives and techniques to provide for both liquid and solid wetting thereby positively affecting surface tension.

A Newtonian fluid is a fluid, such as a straight mineral oil, whose viscosity does not change with rate of flow. Newtonian fluids exhibit shear stress which is the frictional force overcome in sliding one molecular layer of fluid along another, i.e., fluid flow. The shear stress of a Newtonian fluid at a given temperature varies directly with shear rate (velocity). The ratio between shear stress and shear rate is constant. This ratio is termed viscosity.

DETAILED DESCRIPTION OF THE INVENTION

The present invention relates to both chemical compositions and techniques necessary to formulate and manufacture a stable, three phase, high solids, low relative viscosity emulsion exhibiting Newtonian characteristics expressly applicable to but not exclusive to the hydration of hemihydrate (stucco) in the manufacture of water resistant gypsum board. The present invention further provides an emulsion composition having surface and polar properties not normally achievable with these materials.

In order to overcome known deficiencies and to improve the overall performance in the additizing and hydration of stucco, a new and unique three phase emulsion has been developed. The use of this emulsion will also result in significant cost advantages to the gypsum industry, in particular in the formation and drying of a stucco base formulation. It was discovered that certain slack waxes in combination with naphthenic oils; certain anionic and nonionic surfactants derived from sorbitan esters and combinations of acids and amines; lignosulfates and water, form a stable, three phase, emulsion which exhibited Newtonian characteristics and afforded surface chemistries providing certain specific advantages in the formation of stucco.

One of the specific advantages is in the actual formation of hydration of the stucco wherein this newly developed formulation requires less water in dilution thereby requiring lower heat/drying demands to dehydrate the finished core material. This results in significant energy savings and increased production rates. It was further determined that the gypsum crystal growth upon dehydration of the stucco was enhanced when using this formulation providing a more tenacious bond between the stucco and the backing medium.

In addition to the formulation, a technique of manufacture has been developed wherein the aqueous phase is slowly brought into contact with the hydrocarbon phase with an initial inversion which; with the further addition of the aqueous phase, reverts; which with the further addition of the final aqueous phase inverts again forming an extremely stable, low viscosity, high solids, three phase emulsion. Further, due to the emulsion's chemistry and stability, it is possible to dilute the initial concentrate to any level of solids desired by the simple addition of water to the system without upsetting the initial properties.

Suitable gypsums for use in the compositions and methods of the present invention include, by way of example, a-hemihydrate, P-hemihydrate and hydraulic anhydride gypsum.

The dispersing agent is preferably a metallic salt of lignosulfate, such as Ca, Na or Mg salts or combinations thereof. In addition thereto, or in the alternative, the dispensing agent is a Ca or Na lignate.

Emulsifiers used in the compositions of the present invention can include non-ionic surfactants, preferably selected from alkylphenoxypoly (ethleneoxy) ethanols, sorbitan esters such as sorbitan fatty acid esters, hexaoleate polyoxethylene and polyoxyethylene sorbitan fatty acid esters, and anionic surfactants such as saponified fatty acids such as stearic or oleic acids.

Other various components may be added to the composition, including, by way of example, antifoaming agents; artificial light weight aggregates such as pearlite, vermiculite and Shirasuballoon; various blowing agents; reinforcing materials such as glass fibers, asbestos and rock wool; and various hardening speed modifiers for gypsum; and the like.

In addition to the specific method described above and in the Examples below, the waterproofing emulsion of the present invention can be prepared by any means known to those of skill. Such methods include mechanical emulsification and phase inversion emulsification, or a combination thereof. Suitable mechanical emulsification means include homomixers, valve homogenizers, colloid mills and ultrasonic homogenizers.

Typically, the emulsion is diluted with the hydration water. The aqueous emulsion/hydration water mixture is then added to the gypsum and mixed in proportions to provide about 0.5 to about 20 parts of the emulsion solids per 100 parts of gypsum. The resulting slurry composition can then be used to prepare water-resistant gypsum products.

Gypsum products such as gypsum board can be prepared by conventional methods using the compositions described herein. Gypsum wallboard is generally made by depositing a plastic gypsum mass or slurry between fibrous liners, pressing the mass to a desired thickness by means of rollers, allowing the gypsum to set and harden before cutting the formed gypsum board, and finally passing the formed gypsum board through a dryer to remove excess moisture. Lightweight gypsum board is the product obtained by incorporating an aerated foam with the gypsum, thereby causing the production of air spaces in the gypsum mass, with resultant lightening of the finished product.

The following examples illustrate, but are not intended to limit, the compositions and methods of the present invention.

EXAMPLES

Example 1

The following example illustrates a method used to manufacture a three phase emulsion having a measured density of 7.8 pounds per gallon.

| The hydrocarbon phase is composed of the following: | |
|---|---|
| Defined slack wax/microcrystalline wax | 40% |
| Defined naphthenic oil | 1% |
| Polyoxyethylene Sorbitan Monosterate | 2.5% |
| Sorbitan Monosterate | 2.5% |
| The aqueous phase is composed of the following: | |
| Water | 57% |
| Sodium Lignosulfate | 0.2% |
| Antifoam | 0.6% |

The hydrocarbon phase was heated to 185° F. and slowly stirred for a minimum of 10 minutes and until all components were in solution and the solution was visually clear. The solution was further stirred for 5 minutes under moderate agitation. The aqueous phase was heated and held for 10 minutes at 185° F. until the components were in solution and the solution was visually clear (light brown in color but transparent).

The aqueous phase was slowly incorporated into the hydrocarbon phase until an initial inversion occurred (milky white and semi-viscous in appearance). Under mild agitation, the aqueous phase was continued to be slowly incorporated until the system inverted (a change in color back to milky white and a visual reduction in viscosity). The mixture was agitated (stirred) under moderate conditions for 5 minutes or longer; and then sheared to develop a desired particle size of about 1 micron. Stirring or agitation was continued until the emulsion had been cooled to <90° F. in order to set the particle size and stability of the finished system.

The resulting base three phase emulsion possessed the following approximate properties:

| | |
|---|---|
| pH | 6.5–7.0 |
| Viscosity, Brookfield, 2d spindle | |
| @ 50 RPM & 77° F. | 80–120 |
| Solids, mass % | 56–60 |
| Density, #/g | 7.8 |
| Specific Gravity | 0.9378 |

Example 2—Physical Properties Protocols

The following tests are well known in the art in determining whether a product such as gypsum is within acceptable industrial parameters. The above formulations were found acceptable in each of the tests.

Physical Dimensions Test—Gypsum is added to the emulsion, stirred for 1 minute and poured onto a test surface. The material is acceptable if it remains within a 3 to 5 inch diameter.

Set Test—Gypsum/emulsion mixture is poured into a cup and let stand. A weighted needle is inserted into the gypsum/emulsion mixture. This is repeated until the needle cannot penetrate into the material beyond 50% of the depth of the cup. The elapsed time is the mixture's set time.

Adhesion Test—(Measures the percentage of weight gain by the gypsum/emulsion mixture). Gypsum/emulsion mixture is poured onto the unwaxed side of gray facing/backing paper and cured at 110° F. until totally dehydrated. The paper is pulled from the gypsum to see if the gypsum grows into the paper. An acceptable test result is achieved when the gypsum grows into the paper.

Water Resistance Test—(Measures the percentage of weight gain by the gypsum/emulsion mixture). The sample is heated at 110° F. until there is no change in its weight (usually 24 hours). The sample is taken out and allowed to cool at 72° F. in 55% humidity. The sample is then weighed and placed in a 72° F. water bath for 2 hours. The sample is then extracted from the bath, patted dry, then re-weighed. The difference between the weight before and after the bath is the absorbed water number. A final measurement of 1–5% weight gain is acceptable.

Many changes and modifications may be made to the invention without departing from the spirit thereof. The scope of these changes will become apparent from the appended claims.

I claim:

1. A water-resistant gypsum composition comprising gypsum and an emulsion comprising slack wax, microcrystalline wax, naphthenic oil, an emulsifier and a dispersing agent.

2. The gypsum composition of claim 1 wherein said emulsion comprises slack wax in an amount of about 25 to about 50% by total weight of the emulsion.

3. The gypsum composition of claim 2 wherein said emulsion comprises slack wax in an amount of about 35 to about 45% by total weight of the emulsion.

4. The gypsum composition of claim 1 wherein said emulsion comprises naphthenic oil in an amount of about 1 to about 10% by total weight of the emulsion.

5. The gypsum composition of claim 4 wherein said emulsion comprises naphthenic oil in an amount of about 2 to about 6% by total weight of the emulsion.

6. The gypsum composition of claim 1 wherein said emulsion comprises microcrystalline wax in an amount of about 1 to about 20% by total weight of the emulsion.

7. The gypsum composition of claim 1 wherein said emulsion comprises a total wax content of about 30 to about 50% by total weight of the emulsion.

8. The gypsum composition of claim 1 wherein said dispersing agent is a metallic salt of lignosulfate.

9. The gypsum composition of claim 8 wherein said dispersing agent is sodium lignosulfate.

10. The gypsum composition of claim 1 wherein said emulsifier is a sorbitan ester.

11. The gypsum composition of claim 10 wherein said sorbitan ester is selected from sorbitan fatty acid esters and polyoxyethylene sorbitan fatty acid esters.

12. The gypsum composition of claim 1 wherein the dispersing agent comprises Ca or Na lignate.

13. The gypsum composition of claim 1 further comprising an antifoaming agent.

14. An aqueous emulsion comprising water, slack wax, microcrystalline wax, naphthenic oil, an emulsifier and a dispersing agent.

15. The aqueous emulsion of claim 14 comprising slack wax in an amount of about 25 to about 50% by total weight of the emulsion.

16. The aqueous emulsion of claim 14 comprising naphthenic oil in an amount of about 1 to about 10% by total weight of the emulsion.

17. The aqueous emulsion of claim 14 comprising microcrystalline wax in an amount of about 1 to about 20% by total weight of the emulsion.

18. The aqueous emulsion of claim 14 wherein said dispersing agent is a metallic salt of lignosulfate.

19. The aqueous emulsion of claim 14 wherein said emulsifier is a sorbitan ester selected from sorbitan fatty acid esters and polyoxyethylene sorbitan fatty acid esters.

20. The aqueous emulsion of claim 14 wherein said dispersing agent comprises Na or Ca lignate.

21. A method of making an aqueous emulsion comprising mixing a hydrocarbon phase comprising slack wax, microcrystalline wax and naphthenic oil with an aqueous phase comprising water, an emulsifier and a dispersing agent.

22. The method of claim 21 wherein said hydrocarbon phase comprises slack wax in an amount of about 25 to about 50%, and naphthenic oil in an amount of about 1 to about 10% by total weight of the emulsion.

23. The method of claim 21 wherein said emulsifier is a sorbitan ester selected from sorbitan fatty acid esters and polyoxyethylene sorbitan fatty acid esters.

24. The method of claim 21 wherein said dispersing agent is a metallic salt of lignosulfate.

25. The method of claim 21 further comprising, prior to said mixing step, heating the hydrocarbon phase and heating the aqueous phase.

26. The method of claim 25 wherein said mixing step comprises:

dividing aqueous phase into a first, second and third portion;

adding the first portion of the aqueous phase into the hydrocarbon phase to form an invert emulsion;

adding the second portion of the aqueous phase to the invert emulsion until the emulsion reverts; and adding the third portion of the aqueous phase to the resulting reverted mixture until the mixture inverts to form an emulsion.

27. The method of claim 26 further comprising agitating said emulsion; and shearing to develop an average particle size of about 0.5 to about 1.5 microns.

28. The method of claim 27 further comprising agitating emulsion while cooling to set particle size of aqueous emulsion.

29. A method for producing a water-resistant gypsum composition comprising mixing an aqueous slurry comprising calcined gypsum and a waterproofing emulsion, said emulsion comprising slack wax, microcrystalline wax, naphthenic oil, an emulsifier and a dispersing agent.

30. The method of claim 29, wherein said emulsion comprises slack wax in an amount of about 25 to about 50%, and naphthenic oil in an amount of about 1 to about 10% by total weight of the emulsion.

31. The method of claim 29 wherein said emulsifier is a sorbitan ester selected from sorbitan fatty acid esters and polyoxyethylene sorbitan fatty acid esters.

32. The method of claim 29 wherein said waterproofing emulsion is formed by mixing a hydrocarbon phase comprising slack wax, microcrystalline wax and naphthenic oil with an aqueous phase comprising water, an emulsifier and a dispersing agent.

33. A water-resistant gypsum composition made according to the method of claim 29.

34. A water-resistant gypsum composition made according to the method of claim 32.

35. A slurry composition for forming a water-resistant gypsum composition, said slurry composition comprising an aqueous slurry comprising calcined gypsum and a waterproofing emulsion, said emulsion comprising slack wax, microcrystalline wax, naphthenic oil, an emulsifier and a dispersing agent.

36. The slurry composition of claim 35 wherein said emulsion is formed by mixing a hydrocarbon phase comprising slack wax, microcrystalline wax and naphthenic oil with an aqueous phase comprising water, an emulsifier and a dispersing agent.

37. The composition of claim 35 wherein said slurry composition is settable by hydration to form a water-resistant gypsum composition.

38. A water-resistant gypsum board comprising a core layer juxtapositioned between two outer liners, said core comprising the composition of claim 1.

39. A process for manufacturing a water-resistant gypsum board comprising forming an assembly by applying first and second liners to opposite surfaces of a core layer of the composition of claim 35; and drying the assembly under conditions which allow setting of the composition through hydration.

40. A process for manufacturing a water-resistant gypsum board comprising forming an assembly by applying first and second liners to opposite surfaces of a core layer of the composition of claim 36; and drying the assembly under conditions which allow setting of the composition through hydration.

* * * * *